O. W. HART.
ANTIFRICTION BEARING.
APPLICATION FILED JULY 6, 1917.

1,270,821.

Patented July 2, 1918.

INVENTOR
Orlando W. Hart.
by William A. Hardy
HIS ATTY.

UNITED STATES PATENT OFFICE.

ORLANDO W. HART, OF FALL RIVER, MASSACHUSETTS.

ANTIFRICTION-BEARING.

1,270,821.

Specification of Letters Patent.

Patented July 2, 1918.

Application filed July 6, 1917. Serial No. 178,911.

*To all whom it may concern:*

Be it known that I, ORLANDO W. HART, a citizen of the United States, and a resident of Fall River, Bristol county, Massachusetts, have invented certain new and useful Improvements in Antifriction-Bearings, of which the following is a description.

My invention relates to anti-friction bearings, and more particularly to roller bearings of the type described and claimed in Patent #1,205,449, granted to me on November 21, 1916.

The principal object of my invention is to provide an improved construction and arrangement for taking up the end or side thrusts between relatively rotatable members separated by an anti-friction bearing.

Another object of the invention is to provide in combination with the means for taking up the end thrusts, a construction for maintaining the component parts of the bearing in proper relative position when the bearing is in a normal operative condition.

My invention also contemplates an improved arrangement, especially adapted for roller bearings such as disclosed in Patent #1,205,449 referred to above, whereby the means for taking up end or side thrusts is held in proper position when the parts of the bearing are in normal operative position and which preferably is also adapted to prevent the falling apart or collapsing of the parts of the bearing upon the removal of either of the relatively rotatable members between which the bearing is located.

A further object of the invention is to provide a construction for attaining the results described above, which is of simple construction, efficient in operation and the use of which is accompanied with a minimum of friction and wear.

Other objects and features of my invention will be hereinafter particularly described and claimed.

In order that my invention may be more clearly understood, attention is directed to the drawing accompanying and forming a part of this specification, in the several views of which like parts are designated by the same reference characters, and in which.

Figure 2:
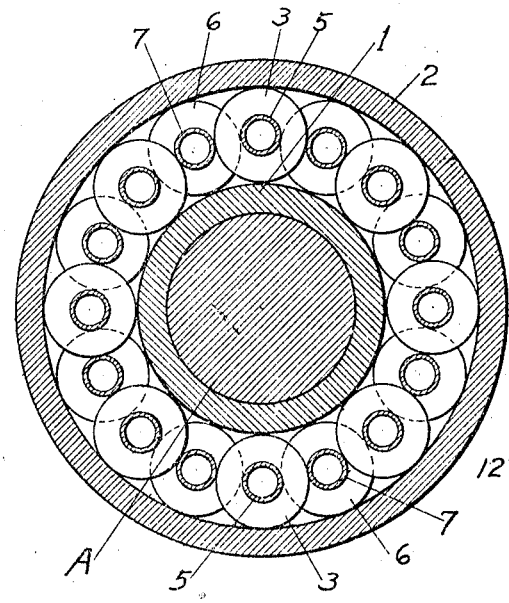
Fig. 2 is a sectional view taken at right angles to Fig. 1, through the inner and outer bearing members and the roller bearing disposed between said members, the rolls being shown in elevation.
Figure 1:
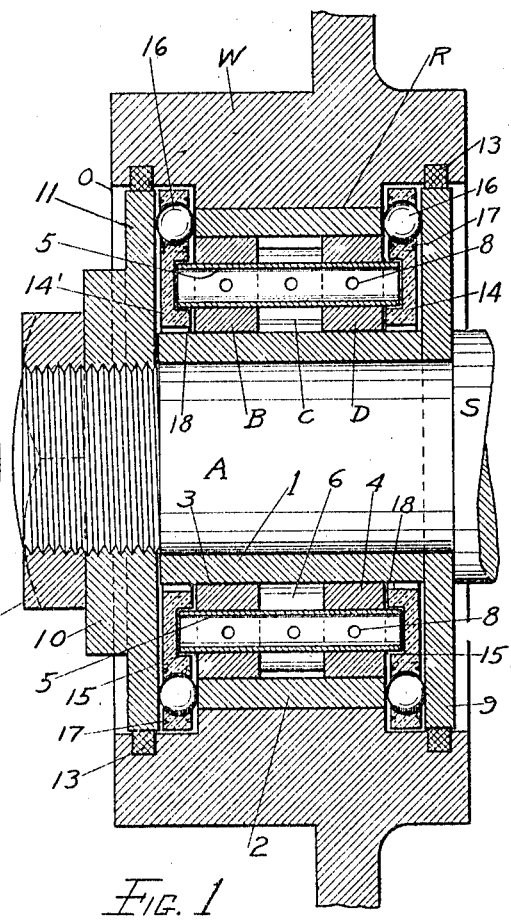
Figure 1 is a central longitudinal sectional view, partly in elevation, through a bearing embodying one form of my invention.

Referring to the drawing and especially to Figs. 1 and 2, reference character A represents the reduced end portion of a shaft or axle S having rigidly secured thereto in any suitable manner a hardened sleeve or bearing member 1. Reference character W represents a wheel or sheave the hub of which is provided with an axially extending cylindrical opening O for receiving the reduced end portion A of shaft S and the roller bearing disposed between said portion and the wheel W. The central portion of the opening O is reduced in diameter as shown at R and has a hardened cylindrical sleeve or outer bearing member 2 for the roller bearing rigidly secured therein. The roller bearing comprises a plurality of annular series of rolls, three series B, C and D being shown, disposed between the inner and outer bearing members or sleeves 1 and 2 which form runways therefor. The sleeve 1 is somewhat longer than sleeve 2 and extends beyond both ends of the roller bearing. The corresponding pairs of rolls 3 and 4 of the alternate or outside series B and D of the bearing are respectively loosely mounted on hollow alining shafts 5, while the rolls 6 of the intermediate series C are respectively loosely mounted on hollow alining shafts 7. The shafts 5 and 7 are parallel to the axis of the bearing and, for a purpose hereinafter described, are preferably somewhat longer than the combined width of series B, C and D. The rolls and alining shafts of each series respectively coact with the alining shafts and rolls of every adjacent series, when the parts are assembled as shown, to maintain the rolls of adjacent series staggered in the manner described in Patent #1,205,449 referred to above. The alining shafts 5 and 7 are preferably provided with perforations 8 whereby, in the rotation of the rolls about the alining shafts and the rotation of the series of rolls about the axis of the bearing, lubricant supplied to the bearing will be thoroughly circulated through the bearing and distributed to all of its parts.

A hardened annular plate 9 is rigidly secured on the portion A of shaft S between one end of the sleeve 1 and the shoulder formed by the said portion A, and a member 10 having an annular hardened flange 11 is adjustably secured to the portion A adjacent the other end of sleeve 1, preferably by being threaded thereon. The member 10 is held in adjusted position by a lock-nut 12 threaded on the end of the reduced portion A of shaft S. The outside diameters of plate 9 and flange 11 of member 10 are slightly less than the diameter of the larger portions of openings O, and packing rings 13 of felt or other suitable material disposed in annular grooves provided therefor in the walls of the opening O, extend into close engagement with the peripheries of plate 9 and flange 11 and serve to exclude dust and dirt from the bearing and to retain the lubricant therein.

In the form of my invention shown in Fig. 1, a flat annular plate 14, the outside diameter of which is substantially the same as plate 9, is loosely disposed on one end of the sleeve 1 and fits loosely in the space between the plate 9 and the adjacent ends of the roller bearing and the outer bearing member or sleeve 2 therefor; and a similar annular plate 14' is loosely disposed on the other end of sleeve 1 and fits loosely in the space between the member 10 and the adjacent ends of the roller bearing and sleeve 2. The opposed faces of plates 14 and 14' are provided with annular grooves 15 in which the extending end portions of the hollow alining shafts 5 and 7 are disposed and loosely fit. The portions of the plates 14 and 14' between the grooves 15 and the inner peripheries thereof are thickened to provide opposed annular lips 18 which extend close to the respective end roll surfaces of the roller bearing, where the speed of the rolls in the operation of the bearing is least, and serve to prevent substantial axial movement of the rolls relative to the sleeves 1 and 2. These lips 18 together with the walls of grooves 15 also prevent any substantial relative axial movement of the rolls and the alining shafts 5 and 7.

The outer portions of plates 14 and 14' are respectively provided with annular series of openings in which balls 16 are loosely disposed, the balls 16 extending beyond the sides of the plates for engagement with the corresponding opposed annular bearing surface provided by the ends of sleeve 2, the flange 11 of member 10 and plate 9. The outer portions of plates 14 and 14' adjacent the openings in which balls 16 are mounted, are steaked as shown at 17, after the balls are mounted in these openings, so that the said balls will be loosely retained within such openings. The balls 16, which are held in proper position with respect to the opposed hardened bearing surfaces of sleeve 2, plate 9 and flange 11 of member 10 by the loosely mounted plates 14 and 14' adjacent the ends of the bearing, provide means for effectively taking up end or side thrusts which may be imposed on either of the members W and S with a minimum of friction. Plates 14 and 14' are held in proper position by the extending end portions of shafts 5 and 7, and also coact with the hollow alining shafts 5 and 7 to maintain the latter and the rolls 3, 4 and 6 in proper assembled position and prevent the collapsing of the bearing upon the separation of shafts S and wheel W, which may be accomplished merely by removing the nut 12 and member 10 from the threaded end of the reduced portion A of shaft S.

The balls 16 in their operation tend to rotate the plates 14 and 14' about the axis of the bearing at one speed, while the series of rolls B, C and D tend to rotate about the axis of the bearing at a different speed, and the construction above described, comprising the extending end portions of shafts 5 and 7 disposed in grooves 15 of plates 14 and 14', permit these rotary movements of plates 14 and 14' and the series of rolls B, C and D at different speeds without interference with the other functions thereof.

Figure 3:
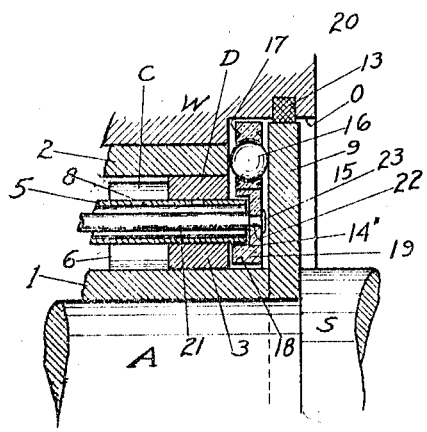
Fig. 3 is a fragmental view, similar to Fig. 1, showing a modification.

In the modified form of my invention shown in Fig. 3, plates 14" (only one of which is shown) which correspond to plates 14 and 14' of Fig. 1, are disposed adjacent the ends of the bearing, and each of these plates is preferably made in two separate and separable annular sections or rings 19 and 20, the ring 19 fitting within ring 20 and forming a track and support therefor. Ring 19 is provided with the annular groove 15 for the extending portions of the hollow alining shafts of the bearing and with the inner annular lips 18, while the outer ring 20 has the balls 16 loosely mounted therein. The inner rings 19 of the two-part annular rings or plates 14" are preferably rigidly secured together in proper spaced relation as by means of several rods 21 (only one of which is shown). Rods 21 respectively extend through some of the hollow alining shafts 5 and 7, the end portions of the rods 21 being reduced at 22 where they extend through the bottom walls of grooves 15 and having their ends headed at 23 whereby the rings 19 will be securely fastened to the rods 21 and will be held thereby in such spaced relation that the end portions of shafts 5 and 7 will be loosely disposed in grooves 15. The construction shown in Fig. 3 is preferable in a good many cases, for it allows the wheel W and shaft S, or other relatively rotatable members, to be readily separated and at the same time effectively prevents and insures against the collapsing or falling apart of the rolls and alining shafts of the bearing upon such separation of the relatively rotatable members W and S. Moreover independent and relatively rotary movement of the inner and outer portions of the plates 14″, is provided for by this construction which results in a decrease in friction, as it will be seen that due to the rotation of balls 16 and the action of the extending end portion of shafts 5 and 7, there is a tendency to produce a differential rotary movement of the inner and outer portions of these plates.

While I have described the preferred embodiments of my invention, it is to be understood that the same are subject to many changes and modifications without departing from the spirit of the invention and the scope of the appended claims.

Having now described my invention, what I claim and desire to protect by Letters Patent is as follows:

1. In device of the class described, a pair of concentric relatively rotatable members, a roller bearing comprising an annular series of rolls disposed between said members, shafts on which said rolls are respectively mounted, and devices at the ends of said bearing respectively provided with means for transmitting end thusts from one of said members to the other and with means adapted to coact with said shafts to hold the same in proper relative position when said members are separated.

2. In a device of the class described, a pair of concentric relatively rotatable members, an annular series of rolls disposed between said members, shafts on which said rolls are respectively mounted and which extend beyond the ends of said rolls, and means having provision for transmitting end thrusts from one to the other of said members and comprising a pair of annular plates loosely mounted adjacent the ends of said bearing respectively, said plates being adapted to coact with the extending end portions of said shafts to hold said shafts in proper relative position.

3. In a device of the class described, a pair of concentric relatively rotatable members, a roller bearing comprising an annular series of rolls disposed between said members, elements provided with annular bearing surfaces secured to one of said members and respectively disposed beyond the ends of said bearing, one of said elements being adjustable with reference to the member to which it is connected, the other of said members being provided with annular bearing surfaces respectively opposed to the annular bearing surfaces of said elements, annular plates respectively loosely disposed between said opposed annular bearing surfaces, and balls loosely mounted in each of said plates and projecting from either side thereof for engagement with the corresponding opposed annular bearing surfaces, said plates being adapted to maintain said rolls in assembled position upon the separation of said members and being themselves maintained in proper position by said roller bearing.

4. In a device of the class described, a pair of concentric relatively rotatable members, the outer member being provided with an internal hardened sleeve rigidly secured thereto, a roller bearing comprising an annular series of rolls disposed and closely fitting in the space between said sleeve and the inner member, shafts on which said rolls are respectively mounted and which extend beyond the ends of the rolls, a pair of plates respectively secured to the inner one of said members beyond the ends of said bearing and provided with annular bearing surfaces respectively opposed to the ends of said sleeve, a pair of annular plates respectively loosely disposed between said opposed bearing surfaces and between the ends of said bearing and the plates secured to the inner members, said annular plates being each provided with an annular groove into which the corresponding extending end portions of said shafts extend, and balls loosely mounted in each of said annular plates and projecting from either side thereof for engagement with the corresponding annular bearing surface and opposed sleeve end.

5. In a device of the class described, a pair of relatively rotatable members, a roller bearing disposed between said members, and two-part annular rings or plates respectively disposed adjacent the ends of the bearing, one part of each of said plates being adapted to maintain the parts of the bearing in proper relative position, and the other part having provision for transmitting end or side thrusts from one to the other of said members.

6. In a device of the class described, a pair of relatively rotatable members, a roller bearing comprising an annular series of rolls disposed between said members, shafts on which said rolls are respectively loosely mounted, and two-part annular plates or rings disposed adjacent the ends of the bearing, one part of each of said plates acting to prevent any substantial relative axial movement of said shafts and rolls, and the other part having provision for transmitting end or side thrusts from one to the other of said members.

7. In a device of the class described, a pair of relatively rotatable members, a roller bearing disposed between said members, and two-part annular rings or plates respectively disposed adjacent the ends of the bearing, one part of one plate and the corresponding part of the other plate being rigidly secured together in spaced relation and being adapted to maintain the parts of the bearing in proper relative position, and the other part of each plate being rotatable relatively to said first part and having provision for transmitting end or side thrusts from one to the other of said members.

8. In a device of the class described, a pair of relatively rotatable members, a roller bearing comprising an annular series of rolls disposed between said members and shafts on which said rolls are respectively loosely mounted and which extend beyond the rolls, and two-part annular plates or rings respectively disposed adjacent the ends of said bearing, the inner portions of said plates being provided with annular grooves in which the extending end portions of said shafts are respectively disposed, and the outer portions of said plates being rotatable on the said inner portions and having provision for transmitting end or side thrusts from one to the other of said members.

9. In a device of the class described, a pair of relatively rotatable members, an annular series of rolls disposed between said members, and a device having provision for transmitting end thrusts from one to the other of said members and adapted to act to maintain the rolls in proper position relative to each other.

10. In a roller bearing, a pair of relatively rotatable members, rollers disposed between said members, and devices at the ends of said bearing respectively having provision for transmitting end thrusts from one to the other of said members and adapted to act to maintain said rollers in proper position relative to each other.

11. In a device of the class described, a pair of relatively rotatable members, rollers including cylindrical bearing rollers disposed between said members, and a device located adjacent and beyond one end of the bearing rollers adapted to act to maintain said rollers in proper relative position and being itself maintained in proper position by said rollers.

12. In a device of the class described, a pair of relatively rotatable members, rollers including cylindrical bearing rollers disposed between said members, and devices respectively disposed adjacent and beyond the ends of the bearing rollers, said devices being adapted to maintain said rollers in proper relative position and being themselves maintained in proper position by said rollers.

13. In a device of the class described, a pair of relatively rotatable members, rollers disposed between said members, and a device adapted to act to maintain said rollers in proper relative position and being itself maintained in proper position by said rollers, said device having provision for transmitting end thrusts from one to the other of said members.

14. In a device of the class described, a pair of relatively rotatable members, rollers including cylindrical bearing rollers disposed between said members, and devices respectively disposed adjacent the ends of the bearing rollers, said devices being adapted to maintain said rollers in proper relative position and being themselves maintained in proper position by said rollers, said devices each having provision for transmitting end thrusts from one to the other of said members.

15. In a device of the class described, a pair of relatively rotatable members, a roller bearing disposed between said members, and plates respectively disposed adjacent the ends of the bearing, a portion at least of one plate and a portion at least of the other plate being rigidly secured together in spaced relation and being adapted to maintain the parts of the bearing in proper relative position, each plate having provision for transmitting end or side thrusts from one to the other of said members.

16. In a roller bearing, an annular roller assembly comprising bearing rollers and portions projecting beyond the end bearing roller surfaces of the bearing, and an annular plate adjacent one end of the bearing assembly having an annular groove for the reception of said portions at such end of the bearing, said plate being provided inwardly of said groove with a portion extending beyond the rest of the plate toward the bearing rollers.

17. In a roller bearing, an annular series of bearing rollers, a plate disposed adjacent one end of said rollers and having a portion extending beyond the rest thereof toward the bearing rollers for engagement with only the inner portions of the adjacent end surfaces of said rollers.

This specification signed and witnessed this 26th day of June, 1917.

ORLANDO W. HART.